US011012996B2

(12) United States Patent
Karaki et al.

(10) Patent No.: US 11,012,996 B2
(45) Date of Patent: May 18, 2021

(54) DEVICES AND METHODS FOR SCHEDULING DATA TRANSMISSIONS IN A WIRELESS COMMUNICATION SYSTEM

(71) Applicant: Telefonaktiebolaget LM Ericsson (publ), Stockholm (SE)

(72) Inventors: Reem Karaki, Aachen (DE); Peter Alriksson, Hörby (SE); Jung-Fu Cheng, Fremont, CA (US); Gen Li, Beijing (CN); Amitav Mukherjee, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 151 days.

(21) Appl. No.: 15/822,498

(22) Filed: Nov. 27, 2017

(65) Prior Publication Data
US 2019/0166599 A1    May 30, 2019

(51) Int. Cl.
*H04W 72/12* (2009.01)
*H04W 72/08* (2009.01)
(Continued)

(52) U.S. Cl.
CPC ....... *H04W 72/0446* (2013.01); *H04L 5/0053* (2013.01); *H04L 5/0082* (2013.01);
(Continued)

(58) Field of Classification Search
CPC ........... H04W 72/0446; H04W 72/085; H04W 72/1268; H04W 72/0413; H04W 72/082; H04W 72/12; H04L 5/0053
See application file for complete search history.

(56) References Cited

U.S. PATENT DOCUMENTS 6,522,635 B1 * 2/2003 Bedwell ............ H04B 7/18528
370/314
6,697,346 B1 * 2/2004 Halton ................. H04B 7/216
370/335
(Continued)

FOREIGN PATENT DOCUMENTS

EP    1235402 A2    8/2002
EP    2942888 A1    11/2015
(Continued)

OTHER PUBLICATIONS

International Search Report and Written Opinion of the International Searching Authority, PCT/SE2018/050935, dated Jan. 15, 2019, 10 pages.
(Continued)

Primary Examiner — Hoang-Chuong Q Vu
(74) Attorney, Agent, or Firm — Sage Patent Group

(57) ABSTRACT

Embodiments herein relate to a method performed by a transmitting device for handling communication of data towards a receiving device in a wireless communications network. The transmitting device schedules a data transmission of a data burst in at least one sub-slot of a first slot, and in a second slot, wherein the at least one sub-slot differs in time length compared to the second slot. The transmitting device further transmits at least part of the at least part of the data transmission as scheduled by scrambling the data transmission independent of a transmission time of the at least part of the data transmission.

17 Claims, 13 Drawing Sheets

(51) Int. Cl.
  *H04W 72/04* (2009.01)
  *H04L 5/00* (2006.01)
(52) U.S. Cl.
  CPC ......... *H04W 72/085* (2013.01); *H04W 72/12* (2013.01); *H04W 72/1268* (2013.01); *H04L 5/001* (2013.01); *H04L 5/0023* (2013.01); *H04W 72/0413* (2013.01); *H04W 72/082* (2013.01)

(56) References Cited

U.S. PATENT DOCUMENTS

| | | | |
|---|---|---|---|
| 7,106,689 B1* | 9/2006 | Sudo | H04L 1/04 370/208 |
| 2010/0041429 A1* | 2/2010 | Sidi | H04B 7/022 455/522 |
| 2010/0190459 A1* | 7/2010 | Li | H03G 3/3078 455/234.1 |
| 2016/0337103 A1 | 11/2016 | Kim et al. | |
| 2018/0213530 A1* | 7/2018 | Mochizuki | H04W 72/12 |
| 2018/0302195 A1* | 10/2018 | Kim | H04L 1/18 |
| 2019/0069256 A1* | 2/2019 | Jung | H04W 56/0015 |
| 2019/0150198 A1* | 5/2019 | Sun | H04L 1/0068 370/329 |
| 2019/0158251 A1* | 5/2019 | Park | H04L 1/08 |
| 2019/0159213 A1* | 5/2019 | Baldemair | H04W 76/11 |
| 2019/0268930 A1* | 8/2019 | Rudolf | H04W 72/14 |
| 2019/0289513 A1* | 9/2019 | Jeon | H04W 52/40 |
| 2020/0077470 A1* | 3/2020 | Xiong | H04L 1/1854 |
| 2020/0100221 A1* | 3/2020 | Tang | H04J 11/0073 |
| 2020/0107301 A1* | 4/2020 | Chen | H04L 1/1671 |
| 2020/0245338 A1* | 7/2020 | Baldemair | H04L 5/0094 |
| 2020/0280403 A1* | 9/2020 | Xu | H04W 72/0446 |
| 2020/0281011 A1* | 9/2020 | Xiong | H04B 7/0695 |
| 2020/0351923 A1* | 11/2020 | Karaki | H04L 5/0094 |

FOREIGN PATENT DOCUMENTS

| | | |
|---|---|---|
| EP | 2988536 A1 | 2/2016 |
| KR | 20170114980 A | 10/2017 |
| RU | 2538180 C2 | 1/2015 |
| WO | 2011/000110 A2 | 1/2011 |
| WO | 2017176044 A1 | 10/2017 |

OTHER PUBLICATIONS

Nokia, Nokia Shanghai Bell, On the Frame structure and Wideband operation for NR-U, 3GPP TSG RAN WG1 Meeting #95, Spokane, USA, Nov. 12-16, 2018, R1-1812697, 14 Pages.

Office Action dated Oct. 1, 2020 for Russian Patent Application No. 2020121374, 6 pages.

* cited by examiner

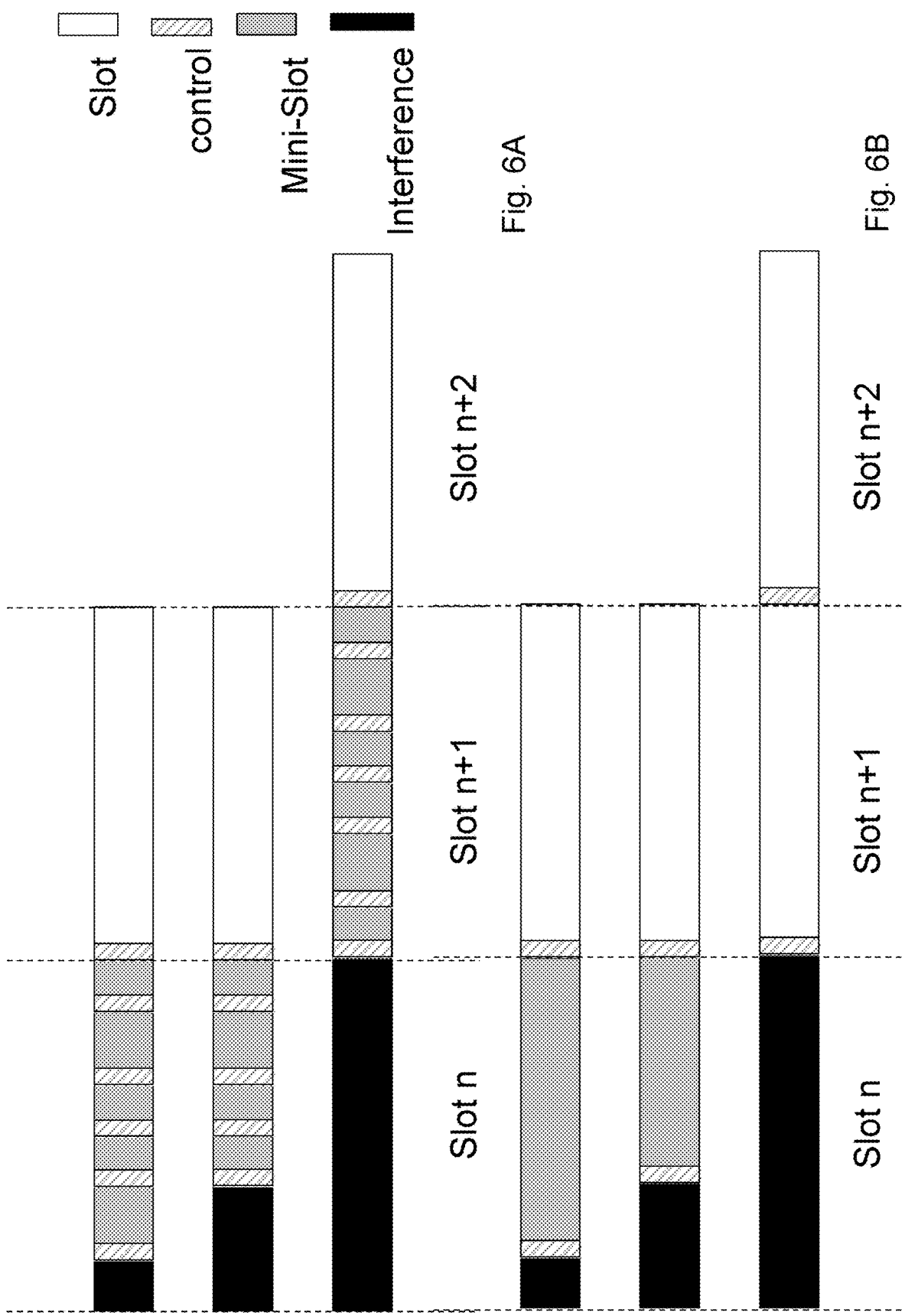

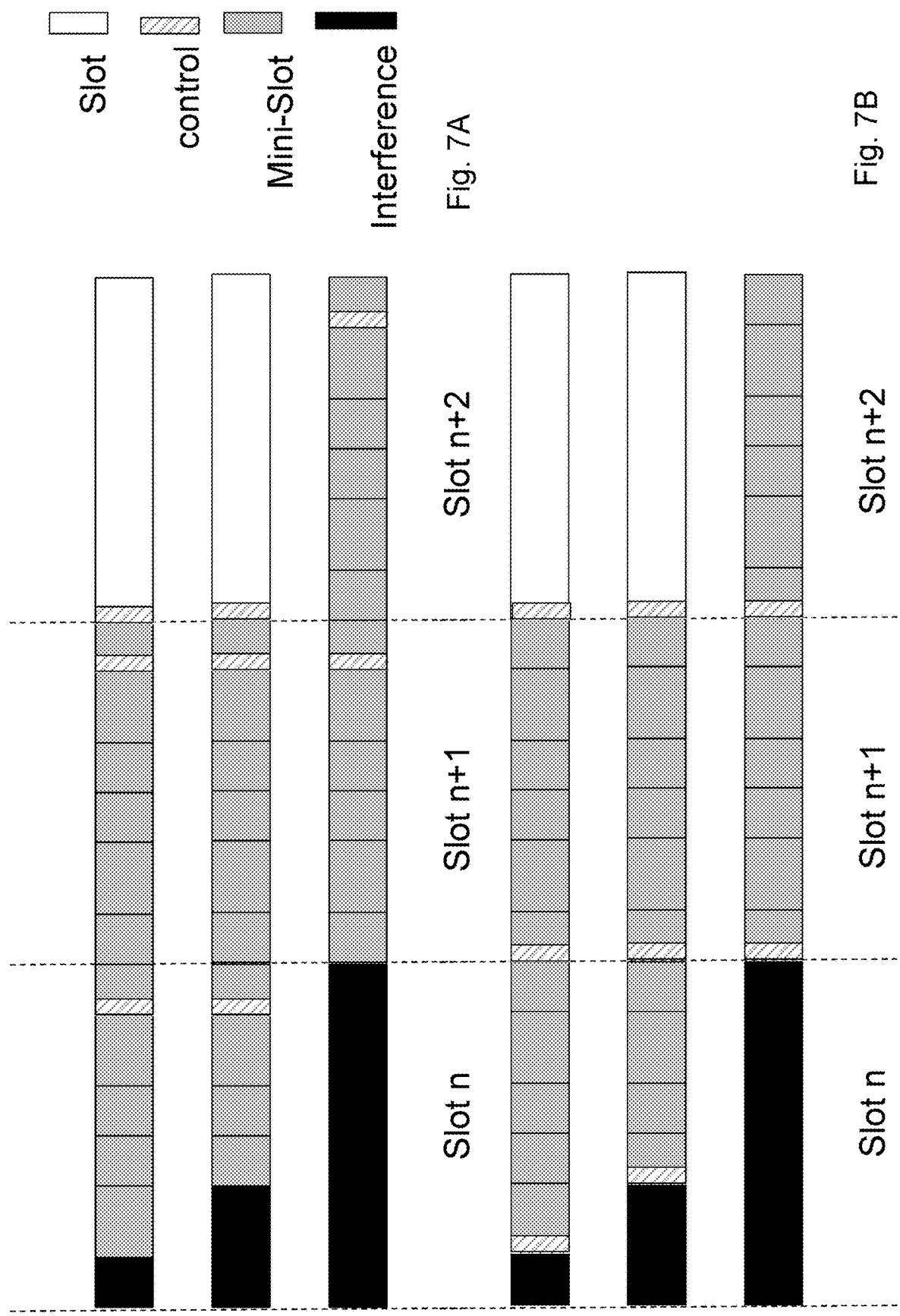

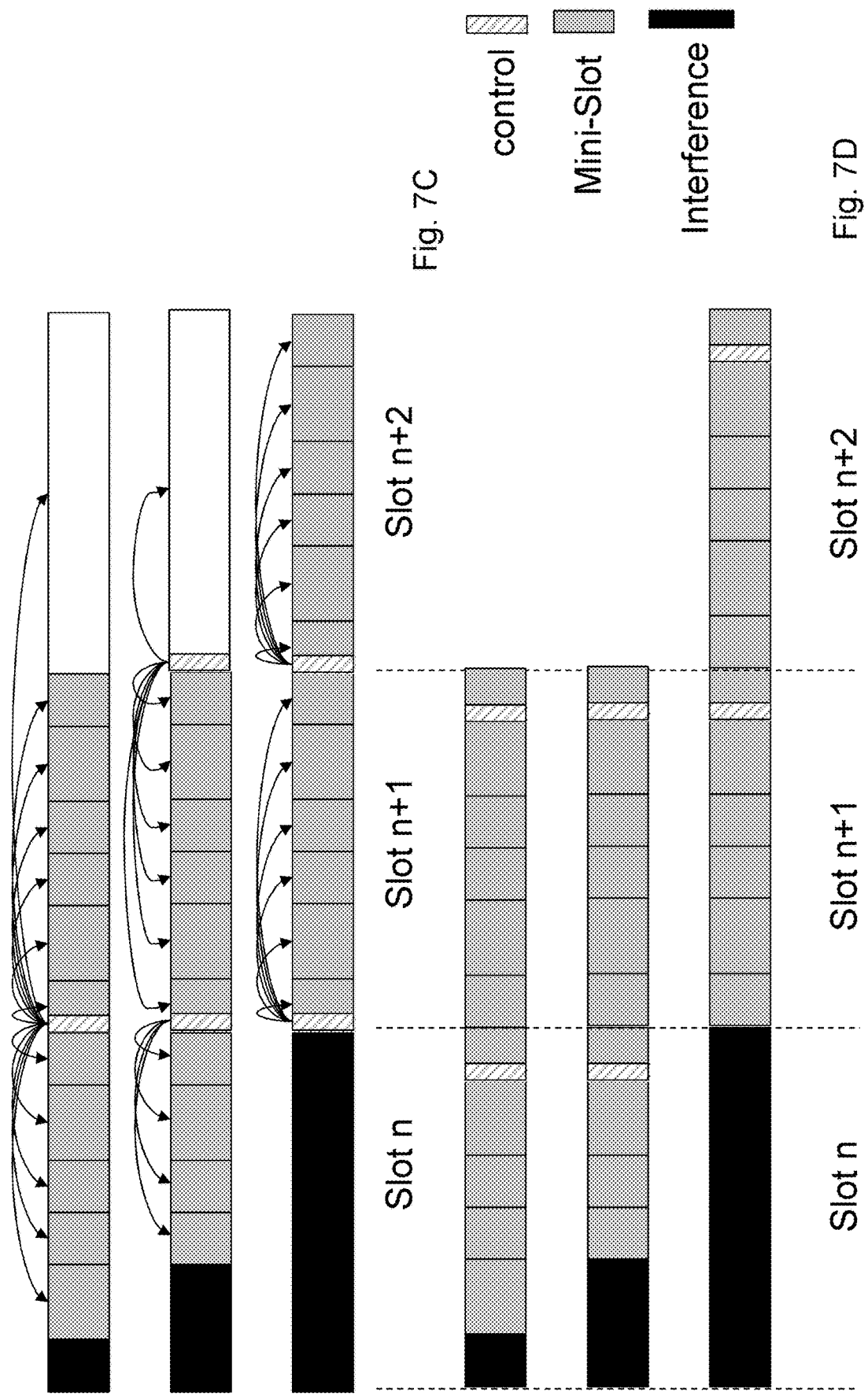

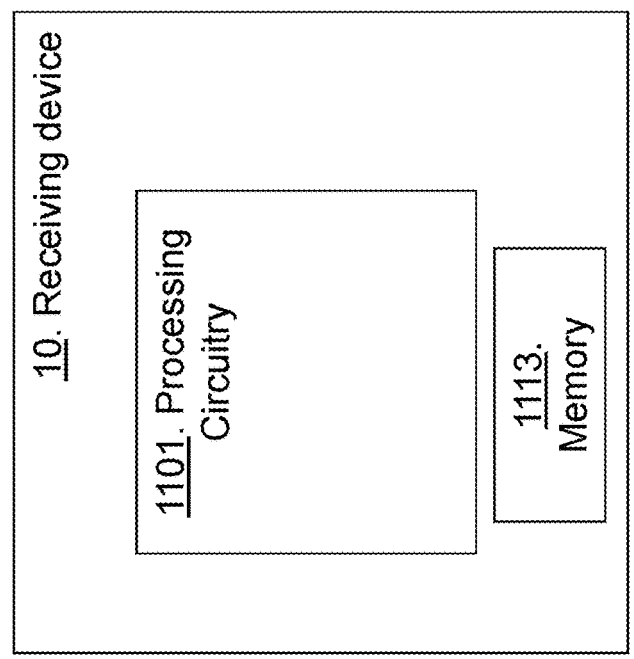
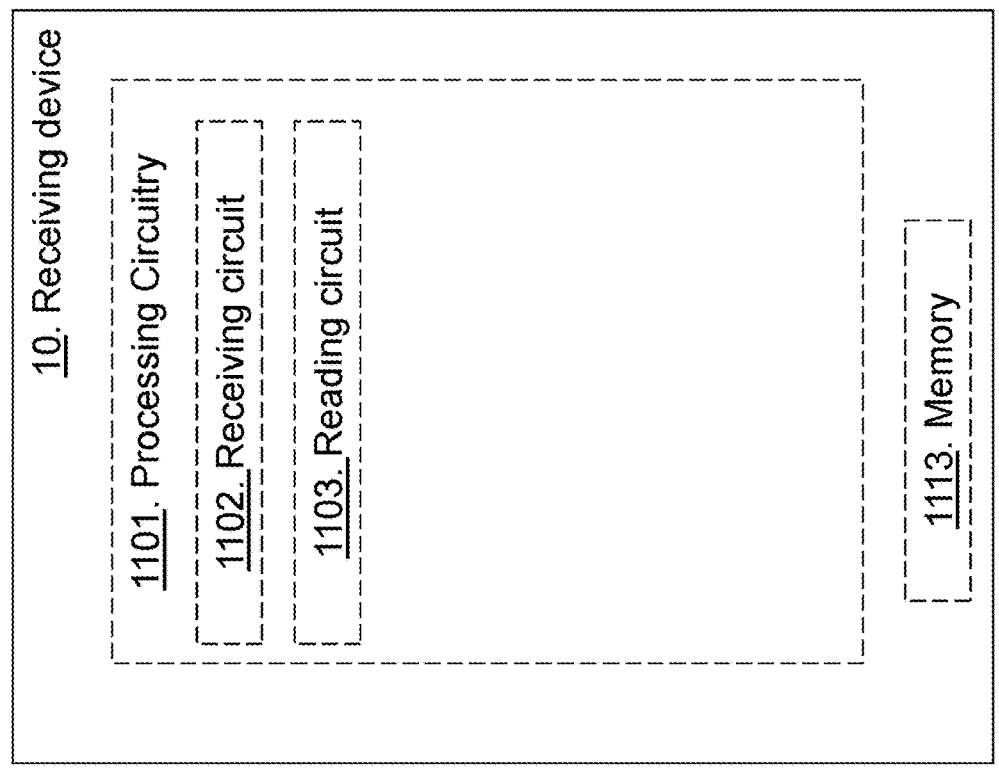
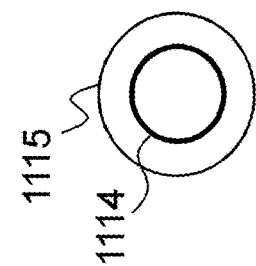
Fig. 9

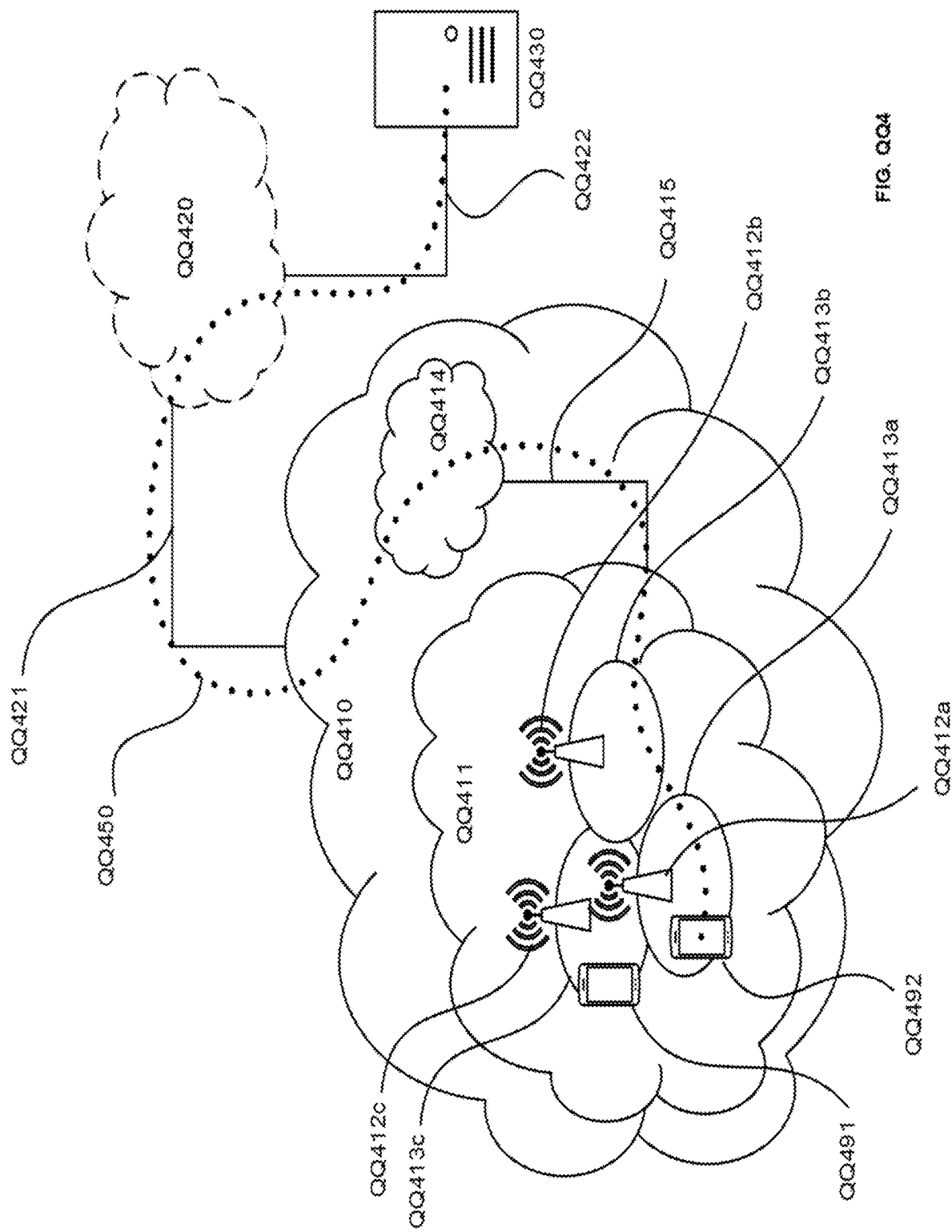
FIG. QQ4

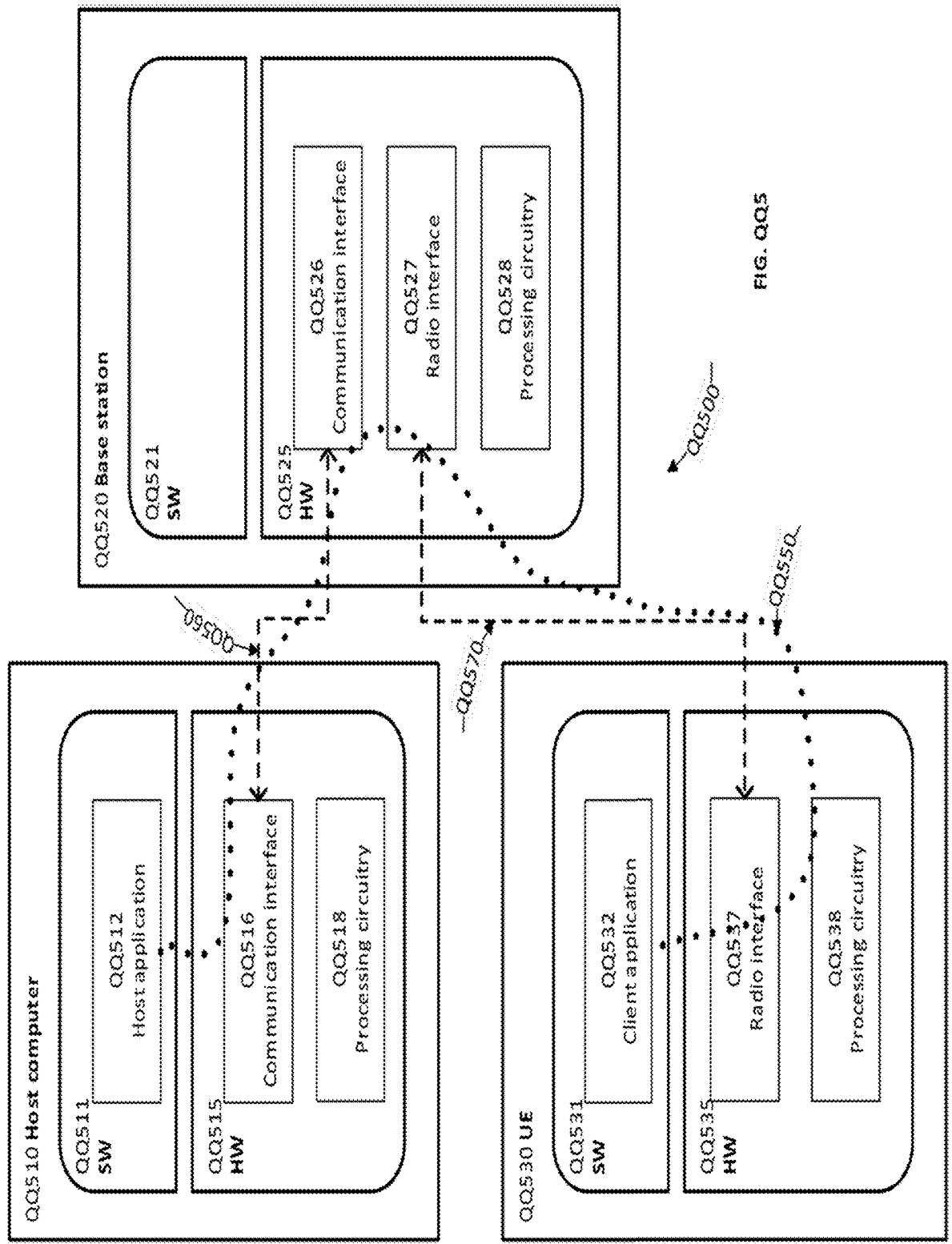
FIG. QQ5

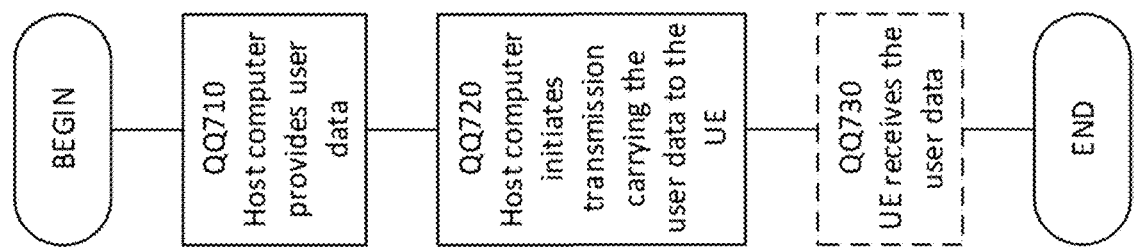
FIG. QQ7
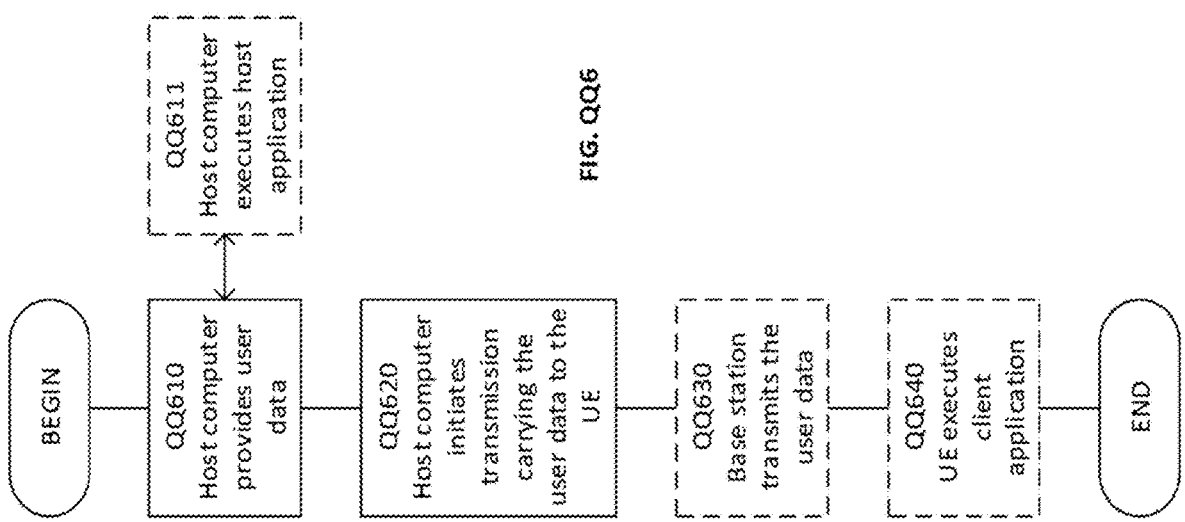
FIG. QQ6

DEVICES AND METHODS FOR SCHEDULING DATA TRANSMISSIONS IN A WIRELESS COMMUNICATION SYSTEM

Embodiments herein relate to a transmitting device, a receiving device and methods performed therein. Furthermore, a computer program and a computer readable storage medium are also provided herein. In particular, embodiments herein relate to handling communication between the transmitting device and the receiving device in a wireless communication network.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area and provide radio coverage over service areas or cells, which may also be referred to as a beam or a beam group, with each service area or beam being served or controlled by a radio network node such as a radio access node e.g., a Wi-Fi access point or a radio base station (RBS), which in some networks may also be denoted, for example, a "NodeB" or "eNodeB" or "gNodeB". The radio network node communicates over an air interface operating on radio frequencies with the wireless device within range of the radio network node.

A Universal Mobile Telecommunications network (UMTS) is a third generation (3G) telecommunications network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network also referred to as New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

The 5th generation of cellular system, called New Radio (NR) is developed for maximum flexibility to support multiple and substantially different use cases. Besides the typical mobile broadband use case, also machine type communication (MTC), ultra-low latency critical communications (ULLCC), side-link device-to-device (D2D) and several other use cases too.

In NR a basic scheduling unit is called a slot. A slot consists of either 14 Orthogonal Frequency Division Multiplexing (OFDM) symbols for a normal cyclic prefix configuration.

The first OFDM symbol(s) of a slot contains control information for the wireless device, the so called control region. This control information can for example be downlink assignments or uplink grants, wherein radio resource for downlink transmissions respective uplink transmissions are defined.

To reduce latencies a mechanism called mini-slots has been introduced in NR. A mini-slot is, as the name suggests, a slot that has fewer OFDM symbols, i.e. shorter length in time, than a regular slot. Mini-slots may be of a length of 1 to 14 OFDM symbols. The mini slot is thus a sub-slot of a regular slot being of shorter length than a regular slot which is defined being of a length of 14 OFDM symbols.

Similar to a regular slot, the first OFDM symbol(s) of a mini-slot contains control information. Thus for a wireless device to be able to be scheduled using mini-slots, the wireless device must monitor the control region of every possible location of the mini-slot. For example, if the mini-slot comprises two symbols out of one is the control region, the wireless device needs to monitor the control region every second OFDM symbol.

NR also supports flexible bandwidth configurations for different wireless devices on the same serving cell. In other words, the bandwidth monitored by a wireless device and used for its control and data channels may be smaller than the carrier bandwidth. One or multiple bandwidth part configurations for each component carrier can be semi-statically signalled to a wireless device, where a bandwidth part comprises a group of contiguous Physical Resource Blocks (PRB). Reserved resources can be configured within the bandwidth part. The bandwidth of a bandwidth part equals to or is smaller than the maximal bandwidth capability supported by a wireless device.

Before a DL transmission starts, several functions and procedures are performed by the radio network node and transmission point distribution as illustrated in FIG. 1, which shows processing timings of processor actions in the radio network node.

Scheduling which means that the radio network node selects e.g. transport block sizes, modulation levels and/or the PRB allocations for the DL transmission The radio network node needs to consider several factors, such as Channel State Information (CSI) feedbacks, buffer sizes, quality of service requirements, retransmissions, control stratum needs, etc, to select a combination of wireless devices and the corresponding transport block sizes, modulation levels and the PRB allocations. This is a complicated and necessary action that enables high quality of services to LTE users.

Layer 2 (L2) processing denoted L2 in the figure.

This action includes L2 protocol processing at the radio network node, control stratum processing i.e. RAN control processing, and buffer memory management at the radio network node to ensure data integrity.

Layer 1 (L1) processing

This action includes one or more of the following functions and actions at the radio network node:

- Cyclic Redundancy Check (CRC) encoding of transport blocks
- CRC encoding, channel encoding and rate matching of coded blocks
- Scrambling, modulation mapping, layer mapping and precoding
- Reference Signal (RS) and other signal insertion
- Discrete Fourier Transform (DFT)
- Possible windowing, filtering or other processing For a radio network node to be allowed to transmit in unlicensed spectrum, e.g. the 5 GHz band, the radio network node may need to perform a clear channel assessment (CCA). This procedure typically includes sensing a medium, such as a channel, to be idle for a number of time intervals. Sensing the medium to be idle can be done in different ways, e.g. using energy detection, preamble detection or using virtual carrier sensing. Where the latter implies that a transmitting device trying to gain access to the channel reads control information from other transmitting devices informing when a transmission ends. After sensing the channel as idle the transmitting device is typically allowed to transmit for a certain amount of time, sometimes referred to as transmission opportunity (TXOP). The length of the TXOP depends on regulation and a type of CCA that has been performed, but a TXOP typically ranges from 1 ms to 10 ms.

The mini-slot concept in NR allows a transmitting device to access the channel at a much finer granularity compared to e.g. LTE Licensed Assisted Access (LAA), where the channel could only be accessed at 500 µs intervals due to the length of the slot. Using for example 60 kHz subcarrier-spacing and a two symbol mini-slot in NR, the channel can be accessed at 36 µs intervals.

LTE LAA supports several methods for reducing the complexity of control channel monitoring for unlicensed band wireless devices. The radio network node can enable/disable monitoring of certain Downlink Control Information (DCI) formats using Radio Resource Control (RRC) signaling. For the DCI formats that the wireless device monitors, the radio network node can configure the number of blind decodes for each aggregation level for a given DCI format.

In LTE, transmissions are scrambled with a pseudo-random scrambling sequence initialized with input parameters such as

- Wireless device ID,
- cell ID
- slot number, and
- layer number (for spatial multiplexing).

The principle behind including all these quantities is to make interfering transmissions as random as possible in order to exploit the processing gain in a decoding operation.

The inclusion of a timing component, exemplified in the scrambling above as the slot number, in the scrambling procedure implies that a transmission cannot be prepared in advance since the slot needs to be known. A transmission prepared for slot n can only be transmitted on the corresponding slot n. If the radio network node, e.g. a gNB, fails to access the channel during slot n, there are at least two possible solutions:

The baseline option is to treat the data that needs to be retransmitted via a Medium Access Control (MAC) Hybrid Automatic Repeat Request (HARQ) process. The drawback with this solution is that it introduces a long delay because the data blocked for slot n will only be transmitted later. There is a further danger that the data can be blocked for a very long duration, which will cause a Radio Link Control (RLC) retransmission prolonging the procedure even further.

Another option is that a scheduler of the radio network node can re-process the data immediately when it knows the channel access is obtained. This will add additional complexity and processing latency requirements to the radio network node as it is required to finish the reprocessing before the start of the next attempt i.e. the radio network node is required to preprocess each transmission much faster.

These solutions either reduce the performance introducing a long delay to the transmissions or introduce a more complex process at the transmitting device leading to an increased cost or use of processing resources at the transmitting device.

SUMMARY

An object herein is to provide a mechanism that in an efficient manner improves performance of a wireless communications network in terms of reduced delay and/or usage of processing resources.

According to an aspect the object is achieved by providing a method performed by a transmitting device for handling communication of data towards a receiving device in a wireless communications network. The transmitting device schedules a data transmission of a data burst in at least one sub-slot of a first slot, and in a second slot, wherein the at least one sub-slot differs in time length compared to the second slot. The transmitting device further transmits at least part of the data transmission as scheduled, and wherein transmitting the at least part of the data transmission comprises scrambling the at least part of the data transmission independent of a transmission time of the at least part of the data transmission.

According to another aspect the object is achieved by providing a method performed by receiving device for handling communication of data from a transmitting device in a wireless communications network. The receiving device receives, from the transmitting device, at least a part of a data transmission of a data burst in at least one sub-slot of a first slot, and in a second slot, wherein the at least one sub-slot differs in time length compared to the second slot. The receiving device reads control information in the at least one sub-slot or second slot, which control information relates to at least one preceding sub-slot or slot and/or at least one proceeding sub-slot or slot.

It is furthermore provided herein a computer program comprising instructions, which, when executed on at least one processor, cause the at least one processor to carry out any of the methods above, as performed by the receiving device or the transmitting device. It is additionally provided herein a computer-readable storage medium, having stored thereon a computer program comprising instructions which, when executed on at least one processor, cause the at least one processor to carry out the method according to any of the methods above, as performed by the receiving device or the transmitting device.

According to yet another aspect the object is achieved by providing a transmitting device for handling communication of data towards a receiving device in a wireless communications network. The transmitting device is configured to schedule a data transmission of a data burst in at least one sub-slot of a first slot, and in a second slot, wherein the at least one sub-slot differs in time length compared to the second slot. The transmitting device is further configured to transmit at least part of the data transmission as scheduled by being configured to scramble the at least part of the data transmission independent of a transmission time of the at least part of the data transmission.

According to still another aspect the object is achieved by providing a receiving device for handling communication of data from a transmitting device in a wireless communications network. The receiving device is configured to receive, from the transmitting device, at least part of a data transmission of a data burst in at least one sub-slot of a first slot, and in a second slot, wherein the at least one sub-slot differs in time length compared to the second slot. The receiving device is further configured to read control information in the at least one sub-slot or second slot, which control information relates to at least one preceding sub-slot or slot and/or at least one proceeding sub-slot or slot.

Embodiments herein enable reduction of a control signaling overhead while still benefiting from high channel access granularity that is provided by the usage of a mini-slot concept, i.e. using a sub-slot of the first slot. The proposed methods may not increase the requirements on transmitting device scheduling and processing latencies. The following advantages of embodiments herein have been identified:

- using the sub-slot of the first slot supports multiple starting positions within the first slot for flexible and efficient channel access on e.g. an unlicensed spectrum;
- using the sub-slot of the first slot wherein the scrambling is independent of a transmission time of the data transmission reduces transmission delay and increase the overall system performance. This also enable efficient DL scheduling and transmission when multiple starting/ending positions is supported.
- using the sub-slot of the first slot followed by the second slot minimizes the sub-slot overhead.

Hence, embodiments herein result in an improved performance of the wireless communications network in an efficient manner.

BRIEF DESCRIPTION OF THE DRAWINGS

Embodiments will now be described in more detail in relation to the enclosed drawings, in which:

FIGS. 6A-6B show different transmission scenarios according to embodiments herein;

FIGS. 7A-7D show different transmission scenarios according to embodiments herein;

FIG. 9 is a block diagram depicting a receiving device according to embodiments herein;

FIG. QQ4 shows a telecommunication network connected via an intermediate network to a host computer in accordance with some embodiments;

FIG. QQ5 shows a host computer communicating via a base station with a user equipment over a partially wireless connection in accordance with some embodiments;

FIG. QQ6 shows methods implemented in a communication system including a host computer, a base station and a user equipment in accordance with some embodiments; and FIG. QQ7 shows methods implemented in a communication system including a host computer, a base station and a user equipment in accordance with some embodiments.

DETAILED DESCRIPTION

Figure 2:
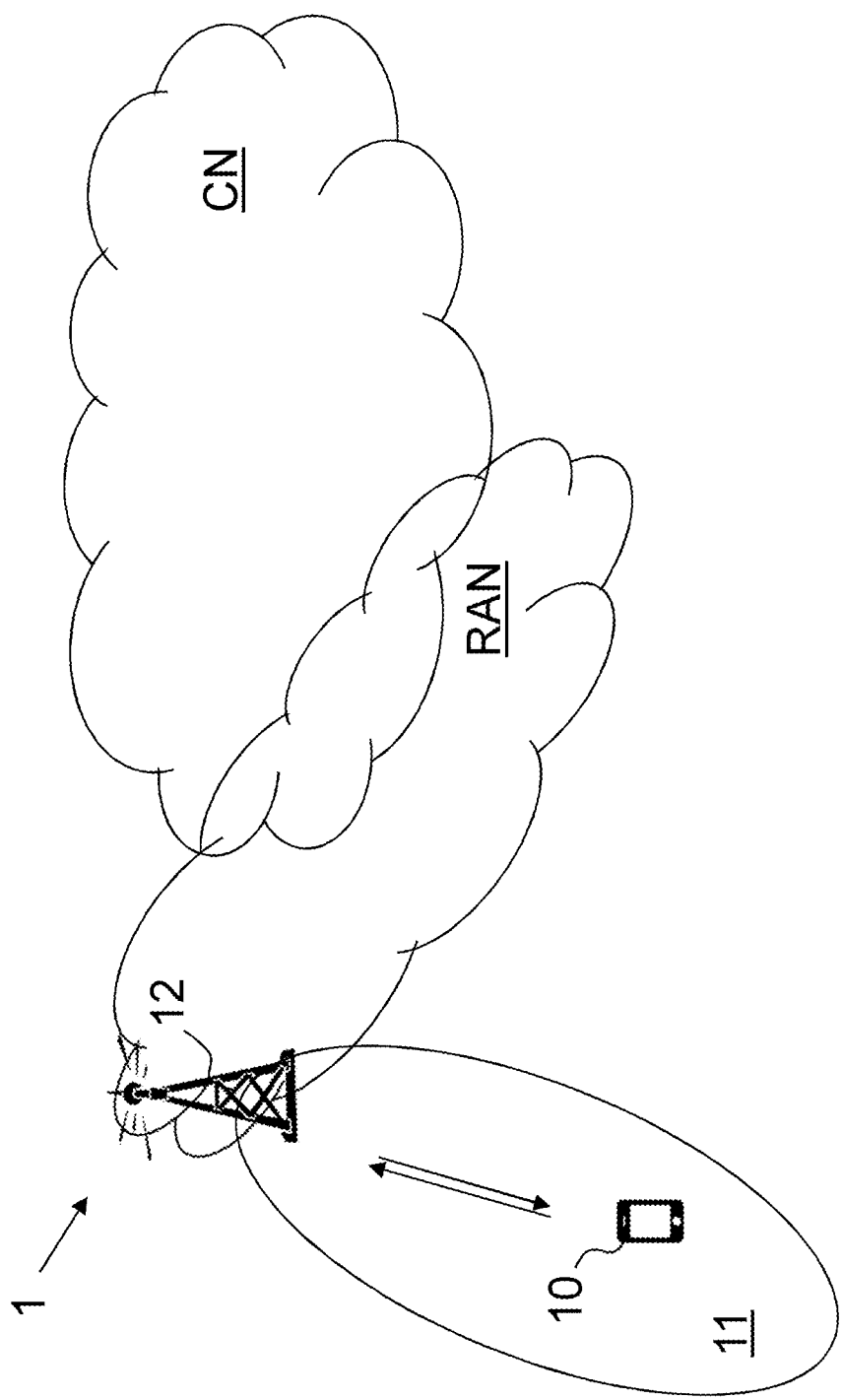
FIG. 2 is a schematic diagram depicting a wireless communications network according to embodiments herein.

Embodiments herein relate to wireless communications networks in general. FIG. 2 is a schematic overview depicting a wireless communications network 1. The wireless communication network 1 comprises one or more RANs and one or more CNs. The wireless communication network 1 may use one or a number of different technologies, such as New Radio (NR), Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context such as NR, however, embodiments are also applicable in further development of the existing wireless communication networks such as e.g. WCDMA, Wi-Fi and LTE just as long as channels are sensed before gained access to.

In the wireless communication network 1, a receiving device 10, such as a wireless device, a mobile station, a non-access point (non-AP) STA, a STA, a user equipment and/or a wireless terminals, may communicate via one or more Access Networks (AN), e.g. a RAN, to one or more core networks (CN). It should be understood by the skilled in the art that "wireless device" is a non-limiting term which means any terminal, wireless communications terminal, user equipment, Machine Type Communication (MTC) device, Device to Device (D2D) terminal, or node e.g. smart phone, laptop, mobile phone, sensor, relay, mobile tablets or even a small base station communicating within a service area.

The wireless communication network 1 comprises a transmitting device 12. The transmitting device 12 may be any wireless device or a radio network node providing radio coverage over a geographical area referred to as service area 11 or cell, which may be provided by one or more beams or a beam group where the group of beams is covering the service area of a first radio access technology (RAT), such as NR, LTE, Wi-Fi or similar. A radio network node may also serve multiple cells, and may be a transmission and reception point e.g. a radio-access network node such as a Wireless Local Area Network (WLAN) access point or Access Point Station (AP STA), an access controller, a base station e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the service area served by the radio network node depending e.g. on the radio access technology and terminology used. The transmitting device 12 communicates with the receiving device 10 within the wireless communication network.

It should here be noted that the transmitting device 12 is illustrated as a radio network node and the receiving device 10 is illustrated as a wireless device. However, both the receiving device and the transmitting device may be wireless devices such as D2D devices.

Embodiments herein relate to a scenario wherein the transmitting device 12 gains access to a channel in the wireless communication network 1 using a sensing technique, e.g. a clear channel assessment procedure, using energy detection, preamble detection or using virtual carrier sensing. This means that the transmitting device 12 senses e.g. measures energy of the channel to determine whether the channel is busy or available. The transmitting device 12 schedules, e.g. sets up modulation and resource assignment, a data transmission of a data burst, such as a downlink (DL) data burst, in at least one sub-slot of a first slot, and in a second slot such as a regular slot i.e. of 14 OFDM symbols. The at least one sub-slot differs in time length compared to the second slot. The at least one sub-slot is a mini slot i.e. of a length shorter than that of a regular slot e.g. less than 14 OFDM symbols. The first slot may comprise two or more sub-slots and the at least one sub-slot may also differ in length relative one another sub-slot in the first slot, i.e. the mini slots may differ in length relative one another. It should further be noted that there may be more first slots before the second slot, so that the transmitting device 12 may switch from sub-slot to slot after two or more first slots.

Figure 1:
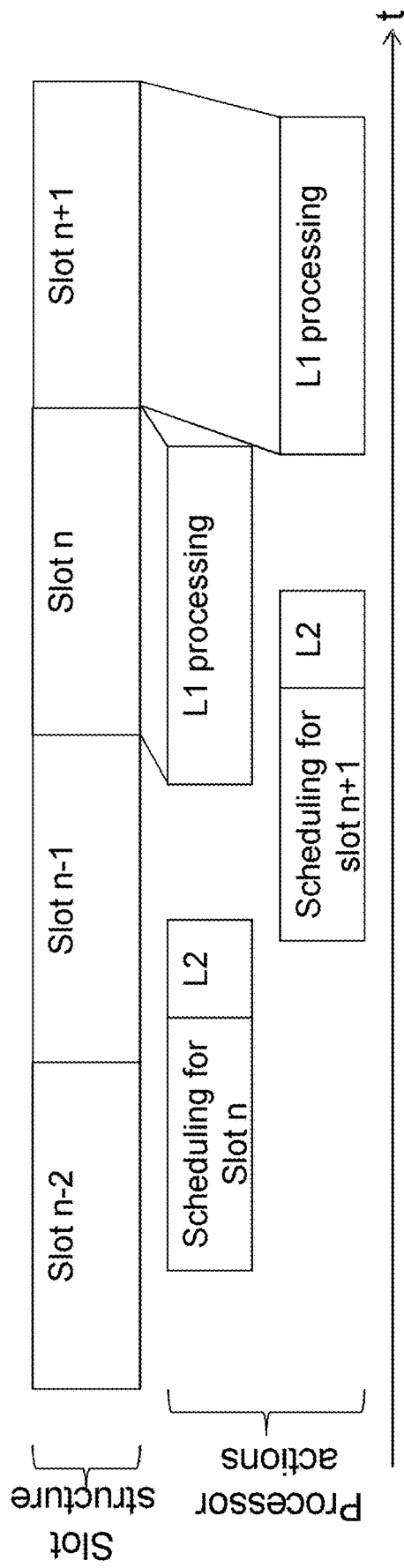
FIG. 1 shows processing timings in a radio network node.

The mini-slot concept in NR, i.e. using sub-slots of a length shorter than a regular slot, allows the transmitting device 12 to access the channel at a much finer granularity. That is, the transmitting device 12 may gain access at more occasions in time over the first slot. However, since every one of these sub-slots contains control signaling such as control information e.g. DCI or similar, it is expected that sub-slots introduce higher signaling overhead as compared to transmissions using regular slots. Besides, radio network nodes are configured to monitor the control region with a periodicity that equals the sub-slot length. This is costly in terms of processing resources and power consumption. According to embodiments herein to overcome signaling overhead, once the transmitting device 12 has gained access to the channel, in many cases scheduling with a regular slot granularity, i.e. regular slots, is sufficient. The transmitting device 12 scrambles the data transmission independent of a transmission time, e.g. slot number is not an input parameter of the scrambling, of the data transmission and thereby enables an efficient retransmission procedure in case the channel is not available during e.g. a first sub-slot. Hence, the transmitting device 12 gains access to the channel by checking the channel based on the timing of the sub-slots and upon gaining access the transmitting device 12 changes to use a longer slot length thereby avoiding higher signaling overhead of using sub-slots. How fast the transmitting device 12 can switch from transmissions of sub-slots to transmissions of slots depends on the transmitting device capabilities and processing latency, which are all affected by the scheduling and L2 and/or L1 processing, as the preparation of the packets starts earlier, as shown in FIG. 1 of the processor actions.

In order to reduce the signaling overhead even further the transmitting device 12 may schedule and transmit control information just in some or one of the sub-slots or slots. Thus, the control information may relate to a number of sub-slots and/or slots and may be transmitted more seldom, see FIGS. 7A-7D, thereby reducing the signaling overhead.

Figure 3:
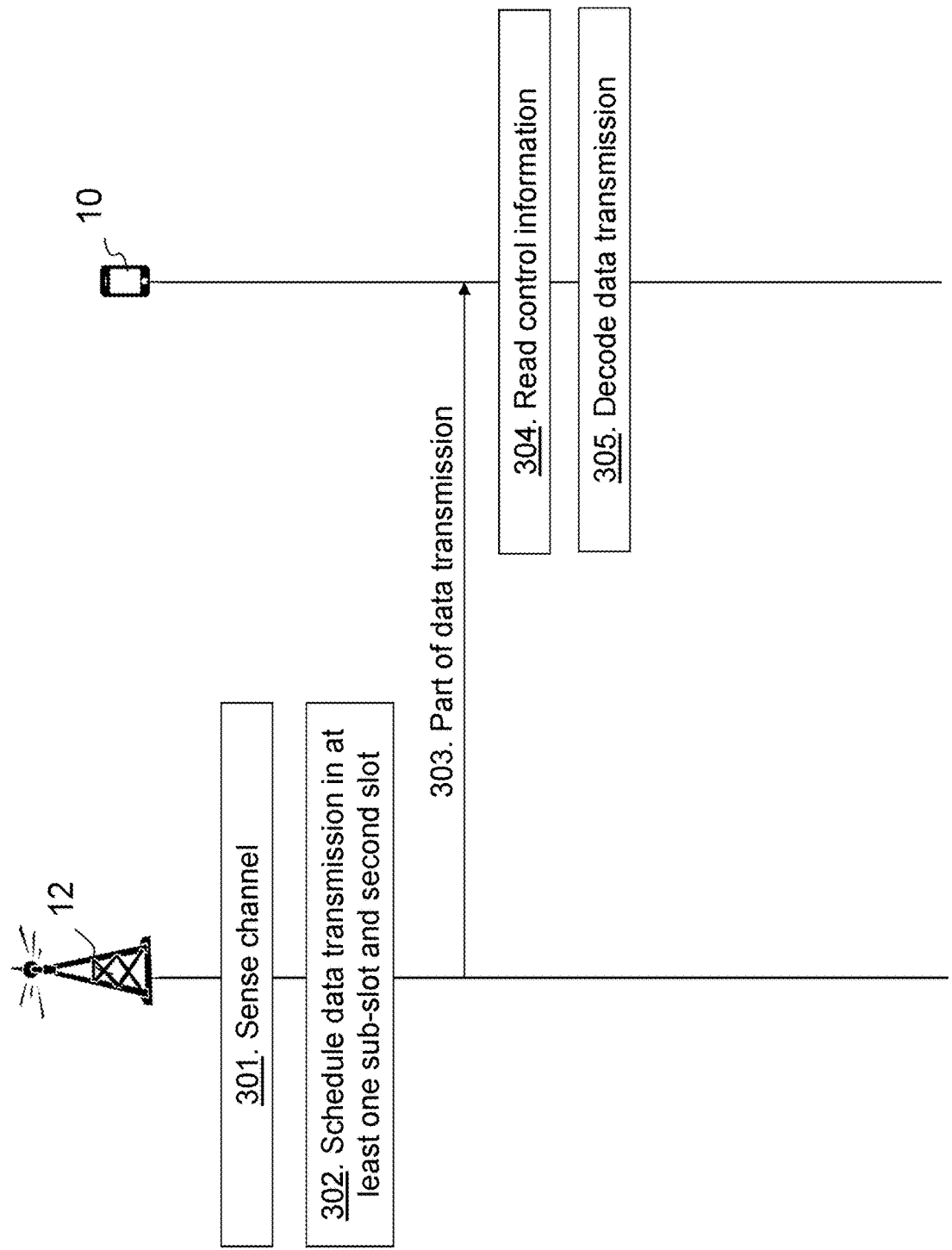
FIG. 3 shows a combined signaling scheme and flowchart according to embodiments herein.

FIG. 3 is a combined flowchart and signaling scheme according to some embodiments herein for handling communication of data towards the receiving device 10 in the wireless communications network 1.

Action 301. The transmitting device 12 schedules the data transmission of the data burst in e.g. two sub-slots of the first slot, and in the second slot. By scheduling the transmitting device 12 may e.g. configure or assign resources for a downlink transmission, i.e. configures sub-slots for downlink transmissions. It should be noted that the scheduling may be performed before the sensing or after the sensing, see action 302. The scheduling is done so that there is enough time from when the scheduling is done until a start of the transmission to do L2 and L1 processing for the first symbol.

Action 302. The transmitting device 12 then senses the channel and may e.g. not gain access for the first sub-slot but may gain access for the second sub-slot.

Action 303. The transmitting device 12 then performs at least parts of the data transmission i.e. transmits the data burst as scheduled in the second sub-slot wherein the transmitting device scrambles the data transmission independent of a transmission time of the data transmission, i.e. independent of the sub-slot number or time of the sub-slot. Thereby, the transmitting device 12 may have multiple starting points and may still not increase the requirements on scheduling and processing latencies of the wireless communication network. The transmitting device 12 may transmit control information in at least one sub-slot out of the at least two sub-slots, e.g. the second sub-slot, thereby reducing the occasions of transmitting the control information. The control information in the at least one sub-slot may e.g. relate to data transmission of one or more sub-slots, i.e. the control information may be for both the sub-slots. In some embodiments the control information may relate to, i.e. concern, any preceding sub-slot and/or any proceeding sub slot. It should also be noted that the control information may, additionally or alternatively, be for any preceding slot and/or any proceeding slot. The control information may comprise information about resources assigned to the wireless device and transmission format, e.g. code rate, modulation, number of layers, number of transport blocks. The control information can point to the resources assigned with an indication such as e.g. a symbol offset, which can be negative in case a preceding (sub-)slot is pointed out or positive in case a proceeding (sub-)slot is pointed out.

Figure 4:
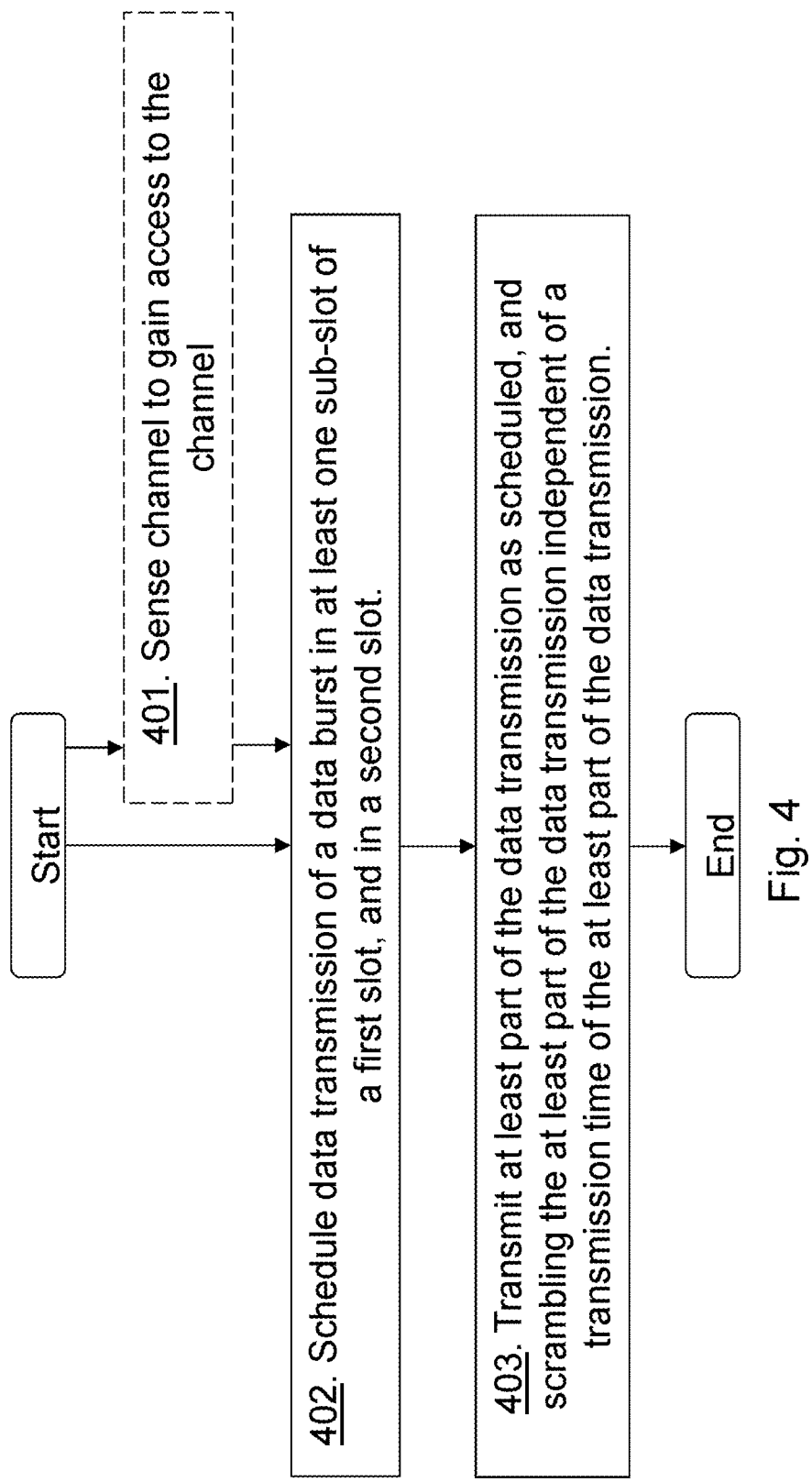
FIG. 4 shows a method performed by a transmitting device according to embodiments herein.

The method actions performed by the transmitting device 12, exemplified herein as a radio base station, for handling communication of data towards the receiving device 10, exemplified herein as a wireless device, in the wireless communications network according to some embodiments will now be described with reference to a flowchart depicted in FIG. 4. The actions do not have to be taken in the order stated below, but may be taken in any suitable order. Actions performed in some embodiments are marked with dashed boxes.

Action 401. The transmitting device 12 may sense the channel to gain access to the channel before transmitting at least part of the data transmission. Each scheduled sub-slot is a possible starting point for the at least part of the data transmission.

Action 402. The transmitting device 12 schedules the data transmission of the data burst in at least one sub-slot of a first slot, and in a second slot, wherein the at least one sub-slot differs in time length compared to the second slot. The data transmission may be scheduled in two sub-slots of the first slot and in the second slot, and the at least part of the data transmission is transmitted in at least one of the sub-slots. The scheduling may be performed before sensing or after sensing the channel. In case the transmitting device senses e.g. performs LBT, before scheduling, the transmitting device 12 starts LBT when there is data for any wireless device. This case allows the transmitting device 12 to adapt the scheduling based on the when in a slot LBT succeeds, but requires more stringent processing requirements in the transmitting device 12. In case the transmitting device 12 senses e.g. performs LBT, after scheduling, the transmitting device 12 starts scheduling when there is data for any user.

Action 403. The transmitting device 12 transmits at least part of the data transmission as scheduled, wherein transmitting the at least part of the data transmission comprises scrambling the at least part of the data transmission independent of a transmission time of the at least part of the data transmission. The transmitting device 12 may transmit the control information in one sub-slot out of the at least two sub-slots or merely in the second slot. The transmitting device 12 may transmit the control information in the at least one sub-slot, which control information relates to at least one preceding sub-slot or slot and/or at least one proceeding sub-slot or slot. The control information may relate to the data transmission of at least two sub-slots. The control information may be transmitted in a last sub-slot of the first slot.

Figure 5:
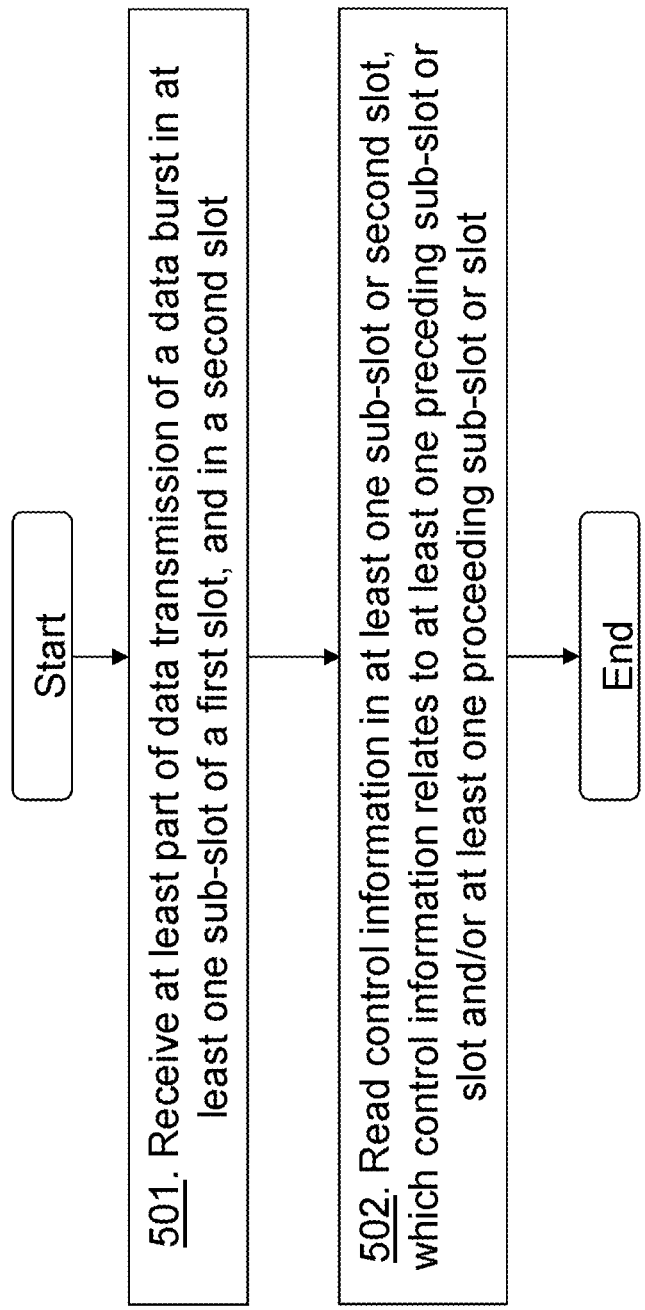
FIG. 5 shows a method performed by a receiving device according to embodiments herein.

The method actions performed by the receiving device 10, exemplified herein as a wireless device, for handling communication of data from the transmitting device 12, exemplified herein as a radio network node, in the wireless communications network according to some embodiments will now be described with reference to a flowchart depicted in FIG. 5. The actions do not have to be taken in the order stated below, but may be taken in any suitable order. Actions performed in some embodiments are marked with dashed boxes.

Action 501. The receiving device 10 receives, from the transmitting device 12, the at least part of the data transmission of the data burst in at least one sub-slot of a first slot, and in a second slot, wherein the at least one sub-slot differs in time length compared to the second slot.

Action 502. The receiving device 10 reads control information in the at least one sub-slot or second slot, which control information relates to at least one preceding sub-slot or slot and/or at least one proceeding sub-slot or slot. This control information may then be used to decode preceding sub-slot or slot and/or at least one proceeding sub-slot or slot. The receiving device 10 only monitors the control region on sub-slot granularity during the first slot. Once the transmitting device 12 has changed to slot based scheduling, it is sufficient if the receiving device 10 monitors on regular slot granularity.

According to embodiments herein transmissions uses a non-time dependent scrambling. Making the scrambling independent of transmission timing allows the transmitting device 12 to postpone the prepared transmission depending on a listen-before-talk outcome, i.e. the outcome of the transmitting device 12 sensing the channel, without rescheduling and with minimal L1 reprocessing.

By enabling that, the DL burst can be split into two sets:
first X (X>=1) transmissions are prepared as sub-slots to enhance the access to the channel and allow the transmitting device 12 to access the channel at a much finer granularity, as a non-limiting example, X is a set of sub-slots that can fit in one slot. Thus, the transmitting device 12 will have X possible starting points within a slot duration. The prepared transmission can be postponed depending on the listen-before-talk outcome without rescheduling and with minimal L1 reprocessing. FIG. 6A shows a solution wherein the transmitting device 12 firstly gains access to a second sub-slot after not gaining access to the first sub-slot. In a second example of FIG. 6A the transmitting device 12 firstly gains access to the third sub-slot after not gaining access to the first or the second sub-slot. In a third example of FIG. 6A the transmitting device 12 firstly gain access to the other first slot and transmits the data burst in the sub-slots of slot n+1 and also in slot n+2. Alternatively, X can be one sub-slot with a length dependent on outcome of the LBT procedure. In this case the transmitting device 12 will have Y possible starting points within a slot duration where Y is pre-configured. Using this method and depending on the radio network node capability the outcome of the LBT procedure may be an input for the scheduling procedure and/or L1 reprocessing is performed on the scheduled transmission to fit in the remaining of the slot.
proceeding transmissions within the same DL burst are transmitted based on a regular slot concept with lower signaling overhead.

FIG. 6A shows an example where the smallest sub-slot length used in the first slot is 2 OFDM symbols (OS) and a fixed sub-slot configuration of different OS lengths within a 14 OS slot is used for the first slot in the DL burst. Thereby, the transmitting device 12 has 6 possible starting points within a slot duration. Proceeding transmissions are prepared based on slots of the length of 14 OS. If the transmitting device 12 fails all opportunities within the first slot, it can attempt again at the next first slot using the sub-slot granularity. However, sub-slots within a slot do not float in time. For instance, if the transmitting device 12 succeeds at the second sub-slot in the slot, as shown in the FIG. 6A top example, it transmits the prepared transmissions from that sub-slot onwards.

FIG. 6B shows an example where the sub-slot length is adapted based on the LBT outcome. As a non-limiting example, sub-slots may have a length of 2-13 symbols. Thereby the transmitting device 12 may have twelve possible starting points within a slot duration. Proceeding transmissions are prepared based on slots of a length of 14 OS. If the transmitting device 12 fails all opportunities within the first slot, it can attempt again at the next first slot using the sub-slot granularity.

Multi-Mini Slot Scheduling

In some embodiments, multi sub-slots scheduling, also denoted as multi-mini slot scheduling, is used to reduce the signaling overhead of the sub-slots. Accordingly, a single control region in a DL (sub) slot can be used to schedule a single or multiple consecutive DL transmission.

If the DCI for the scheduled sub-slots is located in the first scheduled mini-slot, the wireless device 10 will miss the reception of proceeding scheduled sub-slots if the transmitting device 12 fails to access before the first scheduled sub-slot. To solve this issue, a sub-slot can schedule one or more preceding sub-slots within the same slot. Optionally, a multi-sub-slot DCI may be sent in a last sub-slot in the first slot and carry the control information for all preceding transmitted sub-slots within the same first slot. This way, the control information is always included in the transmission regardless of the starting point.

FIG. 7A, shows an example where the smallest length used of the sub-slots is 2 OS and a fixed sub-slot configuration of OSs, e.g. {2,3,2,2,3,2} OS, within a slot of 14 OSs is used for the first slot in the DL burst. Thereby, the transmitting device 12 has 6 possible starting points within the first slot. The control information is sent in the last sub-slot of the first slot. Thus, the DCI is transmitted in the last sub-slot of the first slot and schedules the preceding sub-slots in the same first slot.

FIG. 7B, shows an example where the DCI is transmitted in the first transmitted sub-slot of the first slot and schedules the following sub-slots in the same first slot.

FIGS. 7A-7C show embodiments wherein Option 2, i.e. control information concerns multiple sub-slots or slots, is used in combination with Option 1, i.e. transmitting sub-slots and followed by regular slots.

However, it is not very common to put Physical Downlink Control Channel (PDCCH) in the middle of one slot. To solve this issue, it is proposed that control information e.g. PDCCH at the head of one slot may schedule sub-slots in a proceeding slot or sub-slots. FIG. 7C shows one example to illustrate such an embodiment. When the first sub-slot is not used due to interference, the control information will be included in the succeeding slot or sub-slot. So for wireless devices in this mode, it needs to buffer data including two control regions. If no control information is detected in the first control region, the wireless device 10 may go to the second control region to detect the DCI. Note that the key idea of this embodiment is similar with the above one, i.e. data transmission before DCI.

FIG. 7D is a block diagram depicting a method performed by a transmitting device for handling communication of data towards a wireless device in the wireless communications network. The transmitting device 12 schedules a data transmission of a data burst in at least two sub-slots of a first slot. The transmitting device further transmits at least part of the data transmission in at least one of the two sub-slots. The transmitting device transmits control information in one sub-slot out of the at least two sub-slots. The control information may relate to at least one preceding sub-slot or slot and/or at least one proceeding sub-slot or slot. The control information may relate to the data transmission of the at least two sub-slots. The control information may be transmitted in a last sub-slot of the first slot as shown in 7D.

Figure 8:
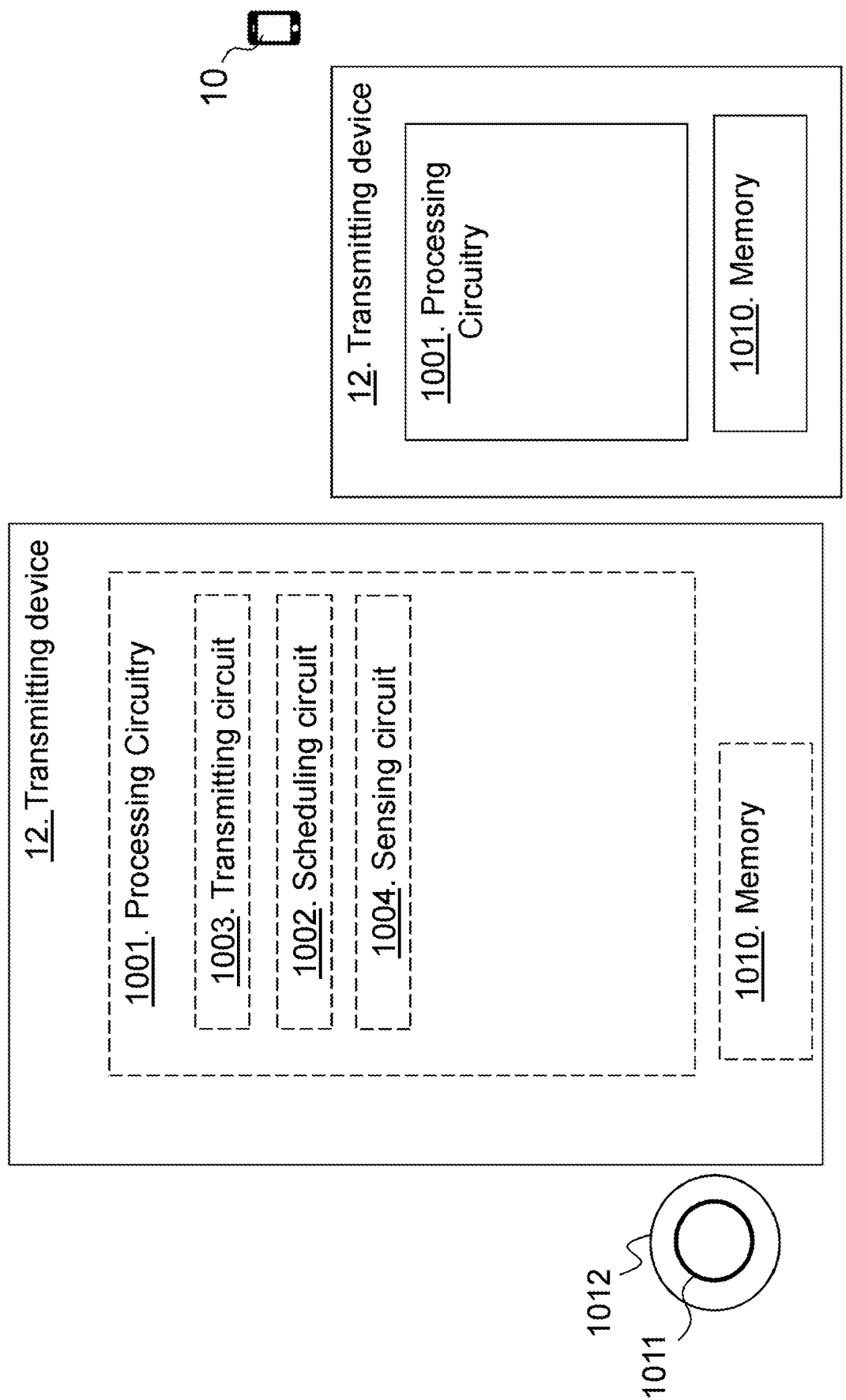
FIG. 8 is a block diagram depicting a transmitting device according to embodiments herein.

FIG. 8 is a schematic block diagram depicting, in two embodiments, the transmitting device 12 for handling communication of data towards the receiving device in the wireless communications network.

The transmitting device 12 may comprise a processing circuitry 801, e.g. one or more processors or similar, being configured to perform the method herein.

The transmitting device 12 may comprise a scheduling unit 802. The transmitting device 12, the processing circuitry 801, and/or the scheduling unit 802 is configured to schedule the data transmission of the data burst in the at least one sub-slot of the first slot, and in the second slot. The at least one sub-slot differs in time length compared to the second slot.

The transmitting device 12 may comprise a transmitting unit 803, e.g. a transmitter or transceiver. The transmitting device 12, the processing circuitry 801, and/or the transmitting unit 803 is configured to transmit at least part of the data transmission as scheduled by being configured to scramble the at least part of the data transmission independent of the transmission time of the at least part of the data transmission.

The transmitting device 12, the processing circuitry 801, and/or the scheduling unit 802 may be configured to schedule the data transmission in at least two sub-slots of the first slot and in the second slot, and the transmitting device 12, the processing circuitry 801, and/or the transmitting unit 803 may be configured to transmit the at least part of the data transmission in at least one of the sub-slots.

The transmitting device 12, the processing circuitry 801, and/or the transmitting unit 803 may be configured to transmit the control information in one sub-slot out of the at least two sub-slots or merely in the second slot.

The transmitting device 12, the processing circuitry 801, and/or the transmitting unit 803 may be configured to transmit the control information in the at least one sub-slot, which control information relates to at least one preceding sub-slot or slot and/or at least one proceeding sub-slot or slot. The control information may relate to the data transmission of at least two sub-slots.

The transmitting device 12, the processing circuitry 801, and/or the transmitting unit 803 may be configured to transmit control information in the last sub-slot of the first slot.

The transmitting device 12 may comprise a sensing unit 804. The transmitting device 12, the processing circuitry 801, and/or the sensing unit 804 may be configured to sense the channel to gain access to the channel before transmitting the at least part of the data transmission, wherein each scheduled sub-slot is a possible starting point for the at least part of the data transmission.

The transmitting device 12 further comprises a memory 805 comprising one or more memory units. The memory 805 comprises instructions executable by the processing circuitry 801 to perform the methods herein when being executed in the transmitting device 12. The memory 805 is arranged to be used to store e.g. information, data such as scheduling information, intervals, control information, etc.

The methods according to the embodiments described herein for the transmitting device 12 are respectively implemented by means of e.g. a computer program 806 or a computer program product, comprising instructions, i.e., software code portions, which, when executed on at least one processor, cause the at least one processor to carry out the actions described herein, as performed by the transmitting device 12. The computer program 806 may be stored on a computer-readable storage medium 807, e.g. a disc, a universal serial bus (USB) stick, or similar. The computer-readable storage medium 807, having stored thereon the computer program, may comprise the instructions which, when executed on at least one processor, cause the at least one processor to carry out the actions described herein, as performed by the transmitting device 12. In some embodiments, the computer-readable storage medium may be a non-transitory computer-readable storage medium. Thus, the transmitting device 12 may comprise the processing circuitry and the memory, said memory comprising instructions executable by said processing circuitry whereby said transmitting device is operative to perform the methods herein.

FIG. 9 is a schematic block diagram depicting, in two embodiments, the receiving device 10 for handling communication of data from the transmitting device 12 in the wireless communications network.

The receiving device 10 may comprise a processing circuitry 901, e.g. one or more processors or similar, being configured to perform the method herein.

The receiving device 10 may comprise a receiving unit 902, e.g. a receiver or transceiver. The receiving device 10, the processing circuitry 901, and/or the receiving unit 902 is configured to receive, from the transmitting device 12, the at least part of the data transmission of the data burst in the at least one sub-slot of the first slot, and in the second slot. The at least one sub-slot differs in time length compared to the second slot.

The receiving device 10 may comprise a reading unit 903. The receiving device 10, the processing circuitry 901, and/or the reading unit 903 is configured to read the control information in the at least one sub-slot or the second slot, which control information relates to at least one preceding sub-slot or slot and/or at least one proceeding sub-slot or slot.

The methods according to the embodiments described herein for the receiving device 10 are respectively implemented by means of e.g. a computer program 904 or a computer program product, comprising instructions, i.e., software code portions, which, when executed on at least one processor, cause the at least one processor to carry out the actions described herein, as performed by the receiving device 10. The computer program 904 may be stored on a computer-readable storage medium 905, e.g. a disc, a USB stick, or similar. The computer-readable storage medium 905, having stored thereon the computer program, may comprise the instructions which, when executed on at least one processor, cause the at least one processor to carry out the actions described herein, as performed by the receiving device 10. In some embodiments, the computer-readable storage medium may be a non-transitory computer-readable storage medium. Thus, the receiving device 10 may comprise the processing circuitry and the memory, said memory comprising instructions executable by said processing circuitry whereby said receiving device is operative to perform the methods herein.

FIG. QQ4: Telecommunication network connected via an intermediate network to a host computer in accordance with some embodiments With reference to FIG. QQ4, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points being examples of the transmitting device 12 above, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example being examples of the receiving device 10 above, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. QQ4 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

FIG. QQ5: Host computer communicating via a base station with a user equipment over a partially wireless connection in accordance with some embodiments Example implementations, in accordance with an embodiment, of the UE, base station and host computer discussed in the preceding paragraphs will now be described with reference to FIG. QQ5. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. QQ5) served by base station QQ520. Communication interface QQ526 may be configured to facilitate connection QQ560 to host computer QQ510. Connection QQ560 may be direct or it may pass through a core network (not shown in FIG. QQ5) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. It's hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. QQ5 may be similar or identical to host computer QQ430, one of base stations QQ412a, QQ412b, QQ412c and one of UEs QQ491, QQ492 of FIG. QQ4, respectively. This is to say, the inner workings of these entities may be as shown in FIG. QQ5 and independently, the surrounding network topology may be that of Figure QQ4.

In FIG. QQ5, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the latency since the resources may be used in a more efficient manner since the transmitting device 12 may gain access more flexible and resources are used efficiently, e.g. control information is sent more seldom, and thereby provide benefits such as reduced waiting time and better responsiveness.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

FIG. QQ6: Methods implemented in a communication system including a host computer, a base station and a user equipment in accordance with some embodiments.

FIG. QQ6 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. QQ6 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. QQ7: Methods implemented in a communication system including a host computer, a base station and a user equipment in accordance with some embodiments.

FIG. QQ7 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. QQ7 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

The invention claimed is:

1. A method performed by a transmitting device for handling communication of data towards a receiving device in a wireless communications network, the method comprising:
   scheduling a data transmission of a data burst in at least one sub-slot of a first slot, and in a second slot, wherein the at least one sub-slot differs in time length compared to the second slot; and
   transmitting at least part of the data transmission as scheduled towards the receiving device, which transmitting comprises scrambling the at least part of the data transmission independent of a transmission time of the at least part of the data transmission;
   wherein transmitting the at least part of the data transmission further comprises transmitting sub-slot control information in at least one sub-slot of the second slot, which the sub-slot control information comprises control information for at least one preceding sub-slot or slot preceding the at least one sub-slot of the first slot and a third slot proceeding after the second slot, wherein no control information is transmitted in the third slot.

2. The method according to claim 1, wherein scheduling the data transmission comprises scheduling the data transmission in at least two sub-slots of the first slot and in the second slot; and
   wherein transmitting the at least part of the data transmission comprises transmitting the at least part of the data transmission in one sub-slot of the at least two the sub-slots of the first slot.

3. The method according to claim 2, wherein the at least two sub-slots of the first slot comprises a first sub slot and a second sub slot of the first slot, the first sub slot preceding the second sub slot of the first slot; and
   wherein transmitting control information further comprises transmitting the sub-slot control information that comprises control information for the at least one preceding sub-slot of the first slot in the at least one sub-slot of the second slot.

4. The method according to claim 1, wherein the sub-slot control information further comprises control information for at least one proceeding sub-slot of the second slot.

5. The method according to claim 1, wherein the sub-slot control information comprises control information for the data transmission of at least two preceding sub-slots of the first slot.

6. The method according to claim 1, wherein transmitting the sub-slot control information comprises transmitting the sub-slot control information in one of a first sub-slot or a last sub-slot of the second slot.

7. The method according to claim 1, further comprising:
   sensing a channel to gain access to the channel before transmitting the at least part of the data transmission, wherein each scheduled sub-slot of the first slot is a possible starting point for the data transmission.

8. The method of claim 1, wherein the sub-slot control information includes an indication that identifies the at least one preceding sub-slot of the first slot.

9. The method of claim 8, wherein the indication comprises a symbol offset associated with the at least one preceding sub-slot of the first slot.

10. A computer program product comprises on a non-transitory computer-readable storage medium, the computer program product comprising instructions which, when executed on at least one processor of a transmitting device, cause the at least one processor to:
    schedule a data transmission of a data burst in at least one sub-slot of a first slot, and in a second slot, wherein the at least one sub-slot differs in time length compared to the second slot;
    transmit at least part of the data transmission as scheduled towards the receiving device by scrambling the at least part of the data transmission independent of a transmission time of the at least part of the data transmission; and
    transmit sub-slot control information in at least one sub-slot in the second slot, the sub-slot control information comprising control information for at least one preceding sub-slot or slot preceding the at least one sub-slot of the first slot and a third slot proceeding after the second slot, wherein no control information is transmitted in the third slot.

11. A transmitting device for handling communication of data towards a receiving device in a wireless communications network, the transmitting device being configured to:
    schedule a data transmission of a data burst in at least one sub-slot of a first slot, and in a second slot, wherein the at least one sub-slot differs in time length compared to the second slot;
    transmit at least part of the data transmission as scheduled towards the receiving device by scrambling the at least part of the data transmission independent of a transmission time of the at least part of the data transmission; and
    transmit sub-slot control information in at least one sub-slot in the second slot, the sub-slot control information comprises control information for at least one preceding sub-slot or slot preceding the at least one sub-slot of the first slot and a third slot proceeding after the second slot, wherein no control information is transmitted in the third slot.

12. The transmitting device according to claim 11, further configured to:

schedule the data transmission in at least two sub-slots of the first slot and in the second slot; and transmit the at least part of the data transmission in one sub-slot of the at least two the sub-slots.

13. The transmitting device according to claim 12, wherein the at least two sub-slots of the first slot comprises a first sub slot and a second sub slot of the first slot, the first sub slot preceding the second sub slot; and the transmitting device further configured to:

transmit the sub-slot control information that comprises control information for the at least one preceding sub-slot of the first slot in the at least one sub-slot of the second slot.

14. The transmitting device according to claim 11, wherein the sub-slot control information further comprises control information for at least one proceeding sub-slot of the second slot.

15. The transmitting device according to claim 11, wherein the sub-slot control information comprises control information for the data transmission of at least two preceding sub-slots of the first slot.

16. The transmitting device according to claim 11, further configured to:

transmit the sub-slot control information in one of a first sub-slot or a last sub-slot of the second slot.

17. The transmitting device according to claim 11, further configured to:

sense a channel to gain access to the channel before transmitting the at least part of the data transmission, wherein each scheduled sub-slot of the first slot is a possible starting point for the at least part of the data transmission.

* * * * *

UNITED STATES PATENT AND TRADEMARK OFFICE
CERTIFICATE OF CORRECTION

| | | |
|---|---|---|
| PATENT NO. | : 11,012,996 B2 | Page 1 of 1 |
| APPLICATION NO. | : 15/822498 | |
| DATED | : May 18, 2021 | |
| INVENTOR(S) | : Karaki et al. | |

It is certified that error appears in the above-identified patent and that said Letters Patent is hereby corrected as shown below:

In the Specification

In Column 1, Line 17, delete "(STA)" and insert -- (STAs) --, therefor.

In Column 1, Line 18, delete "(UE)," and insert -- (UEs), --, therefor.

In Column 1, Line 19, delete "(CN)." and insert -- (CNs). --, therefor.

In Column 2, Line 10, delete "(ULLCC)," and insert -- (ULLCCs), --, therefor.

In Column 2, Line 28, delete "defined" and insert -- defined as --, therefor.

In Column 2, Line 45, delete "(PRB)." and insert -- (PRBs). --, therefor.

In Column 6, Line 35, delete "(AN)," and insert -- (ANs), --, therefor.

In Column 6, Line 36, delete "(CN)." and insert -- (CNs). --, therefor.

In Column 10, Line 22, delete "(OS)" and insert -- (OSs) --, therefor.

In Column 15, Line 36, delete "illustrated" and insert -- as illustrated --, therefor.

In Column 17, Line 26, delete "according" and insert -- according to --, therefor.

Signed and Sealed this
Twenty-fifth Day of January, 2022

Drew Hirshfeld
*Performing the Functions and Duties of the
Under Secretary of Commerce for Intellectual Property and
Director of the United States Patent and Trademark Office*